United States Patent [19]

Johnson

[11] Patent Number: 4,782,674

[45] Date of Patent: Nov. 8, 1988

[54] LOCKING MEANS FOR THE DOORS OF TRUCKS VANS AND THE LIKE

[76] Inventor: James J. Johnson, 2760 Halpern, Ville St. Laurent, Quebec, Canada, H4S 1R6

[21] Appl. No.: 821,586

[22] Filed: Jan. 23, 1986

[51] Int. Cl.<sup>4</sup> .............................................. F05B 65/08
[52] U.S. Cl. ........................................... 70/95; 70/99; 70/100; 292/220; 292/DIG. 32; 292/DIG. 36; 296/50
[58] Field of Search ................ 292/230–238, 292/220, 222–227, 201, DIG. 32, DIG. 36, 345; 70/156, 97, 95–100, DIG. 11; 49/197; 160/201; 296/50

[56] References Cited

U.S. PATENT DOCUMENTS

| | | | |
|---|---|---|---|
| 453,553 | 6/1891 | Estes | 292/230 |
| 660,736 | 10/1900 | Phelps | 70/156 |
| 770,542 | 9/1904 | Slaymaker | 70/156 |
| 888,285 | 5/1908 | Wibel et al. | 70/97 X |
| 1,385,632 | 7/1921 | McNally | 292/227 |
| 1,871,095 | 8/1932 | Tomkinson | 49/197 |
| 2,827,114 | 3/1958 | Stroup | 160/201 |
| 3,258,062 | 6/1966 | Lambert | 292/230 X |
| 3,751,088 | 8/1973 | Schlage et al. | 292/233 X |
| 3,767,244 | 10/1973 | Plaw | 292/227 |
| 3,894,761 | 7/1975 | Brennan | 292/225 |
| 3,933,382 | 1/1976 | Counts et al. | 292/201 X |
| 4,237,711 | 12/1980 | Kambic | 292/223 X |

FOREIGN PATENT DOCUMENTS

| | | | |
|---|---|---|---|
| 673337 | 10/1963 | Canada | 70/99 |
| 632947 | 10/1927 | France | 160/201 |
| 47375 | 1/1930 | Norway | 160/201 X |
| WO83/01478 | 4/1983 | PCT Int'l Appl. | 70/95 |

Primary Examiner—Lloyd A. Gall
Attorney, Agent, or Firm—Bachman & LaPointe

[57] ABSTRACT

A locking arrangement for use on an enclosure which enclosure has an opening and a roll-up door to close the opening, automatically locks the door when it is closed. The arrangement includes a striker member mounted on one side of the door to define a striker path when the door is moved upwardly or downwardly. A lock mechanism includes a dog and means for biasing the dog to removably extend into the striker path. When the door is moved downwardly, the striker will force the dog out of the striker path to thereby permit the striker to pass over the dog and for the door to extend below the dog. When the striker is below the dog and the door is moved upwardly, the dog will engage the striker and prohibit upward movement of the striker and the door.

4 Claims, 3 Drawing Sheets

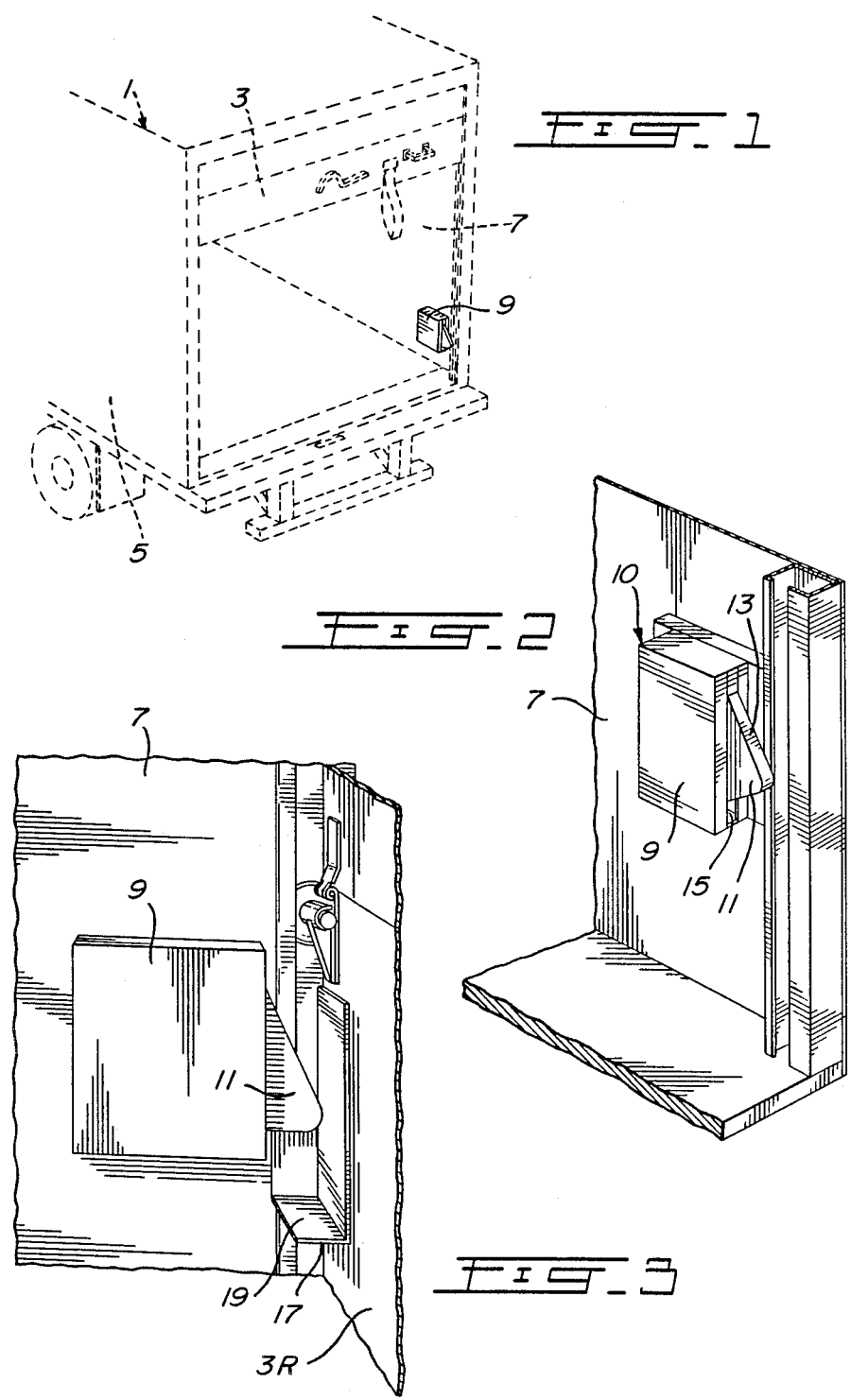

LOCKING MEANS FOR THE DOORS OF TRUCKS VANS AND THE LIKE

BACKGROUND OF INVENTION

1. Field of the Invention

The invention relates to a locking arrangement for a roll-up door of an enclosure. More specifically, the invention relates to such an arrangement wherein the door is automatically locked when it is closed.

2. Description of Prior Art

Roll-up doors for enclosures such as mobile vehicles are known in the art as shown in, for example, U.S. Pat. No. 3,693,693, Court, Sept. 26, 1972. The Court patent teaches a mechanism for fastening, but not locking, the roll-up door of a truck. In addition, the door is not automatically fastened when closed. Instead, a handle must be pivoted after the door is closed in order to fasten it.

U.S. Pat. No. 3,933,382, Counts et al, Jan. 20, 1976, teaches a truck with a roll-up door which includes a locking arrangement for the door. However, once again, the door is not automatically locked when it is closed. Instead, it must be key-locked.

A problem in the trucking industry is that truckers are reluctant to spend the time key-locking the roll-up doors as required in the arrangement of the '382 patent.

SUMMARY OF THE INVENTION

It is an object of the invention to provide a locking arrangement which overcomes the problems of the prior art.

It is a more specific object of the invention to provide a locking arrangement which automatically locks when the door is closed.

In accordance with the invention there is provided a locking arrangement which comprises, on one side of the roll-up door, a striker which defines a striker path when the door moves up and down. A lock mechanism is also included, and the lock mechanism comprises a dog which is biased to removably extend in the striker path.

BRIEF DESCRIPTION OF DRAWINGS

The invention will be better understood by an examination of the following description, together with the accompanying drawings, in which:

FIG 1 illustrates a truck with a roll-up door;

FIG 2 illustrates in greater detail the lock mechanism in accordance with the invention;

FIG. 3 shows the relationship of the striker with the lock mechanism;

DESCRIPTION OF PREFERRED EMBODIMENTS

Figure 2A:
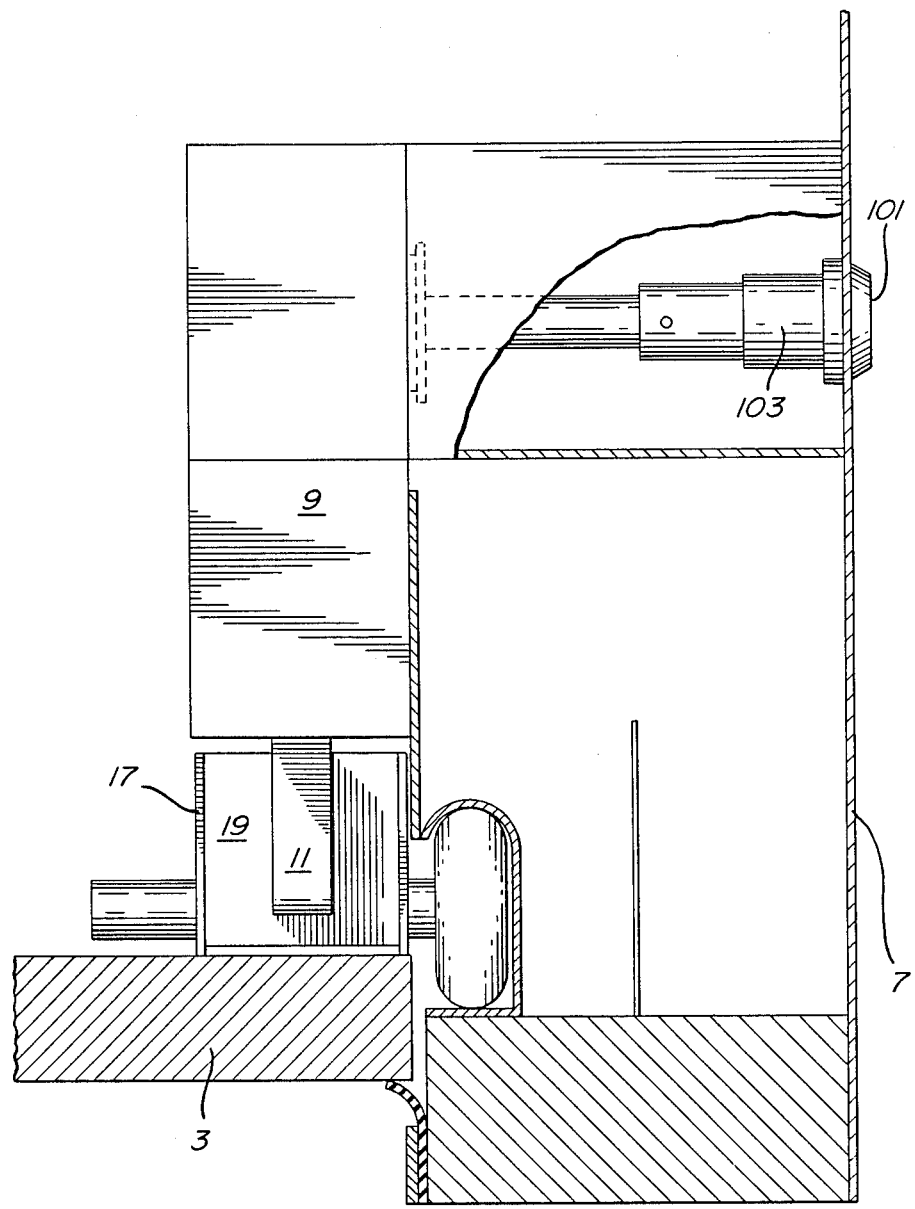
FIG. 2A is a top view of FIG. 3 partially in section.

Referring to the drawings, a mobile vehicle 1, e.g., a truck, includes a roll-up door 3 as is well known in the art. The vehicle has a first side wall 5 and a second side wall 7. The lock mechanism 9 is mounted close to the bottom of the side wall 7.

Referring to FIG. 2, the lock mechanism 9 is enclosed in an outer casing 10. Extending outwardly of the casing 10 is a dog 11 which is biased to extend outwardly of the casing. The dog 11 has a top camming surface 13 and a bottom stop surface 15.

Referring now to FIG. 3, mounted on the inside 3R of the roll-up door is a striker 17 having a horizontal bar 19. The striker is mounted on the which is mounted the lock mechanism 9. As the lock mechanism is mounted on the inner surface of the wall 7, the striker will engage the lock mechanism in operation.

The arrangement operates as follows:

When the door is moved downwardly, the horizontal bar 19 of the striker 17 will cam against the camming surface 13 of the dog 11 and force the dog inwardly into the casing 10, thus forcing the dog out of the striker path defined by the motion of the roll-up door. Accordingly, the striker and the door will be able to pass the dog when the door is moving in the downward direction.

After the striker has passed the dog, because the dog is biased to move to extend outwardly of the casing in its normal condition, the dog will once again extend into the striker path. If one attempts to move the door upwardly, the horizontal bar 19 of the striker 17 will engage the bottom stop surface 15 of the dog 11, and the dog will prevent the horizontal bar, and therefore the roll-up door, from moving any further upwardly. It can therefore be seen that the door will be automatically locked when it is closed.

Figure 4:
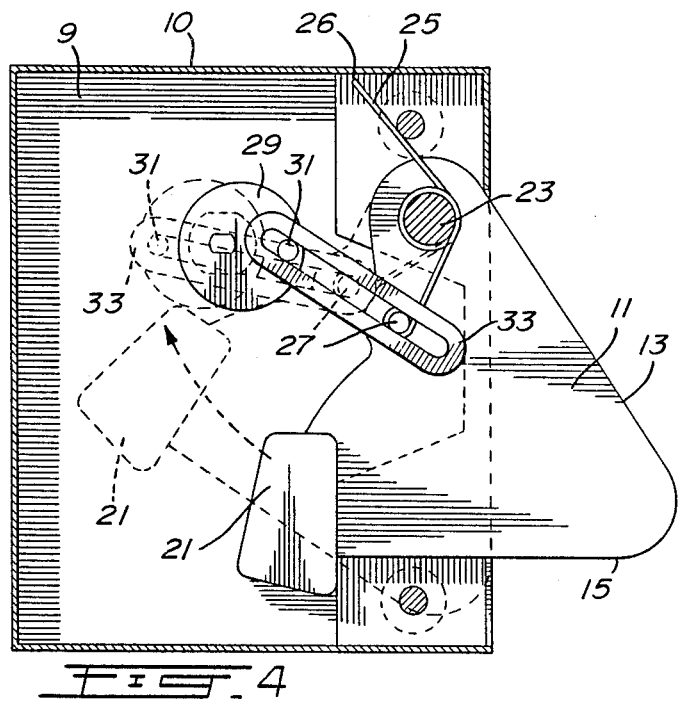
FIG. 4 illustrates a mechanical embodiment of the lock mechanism.

Turning now to FIG. 4, the lock mechanism, on the inside of the casing 10, is illustrated. As can be seen, a balancing weight 21 is included on the inside end of the stop surface 15 of the dog 11. The weight itself will bias the dog to extend outside of the casing 10.

The dog is pivotally mounted on a rod 23, and is biased into the rest position, that is, the position illustrated in solid lines in FIG. 4, by a spring 25 which is anchored to the casing at one end 26 and to pin 27 on the dog 11 at the other end thereof.

An eccentric 29 is mounted for rotation with the cylinder of a lock (not shown), and pin 31 is mounted on the eccentric 29 for rotation therewith. Oval member 33 surrounds both pins 27 and 31.

As will be apparent, the key opening 101 for the lock is mounted on the outside of wall 7 so that the cylinder 103 of the lock is in line with the eccentric 29.

In operation, when the key is inserted into the keyhole and the key is rotated, to thereby rotate also the cylinder lock, the eccentric 29 will rotate with the cylinder lock. When the cylinder, and thereby the eccentric 29, are rotated through 180°, the pin 31 will be moved to a position 180° from its original position, that is, the position of 31 illustrated in dotted lines. As the pin 31 moves, it will pull with it the oval member 33, and the oval member 33 will, in turn, pull with it the pin 27. Accordingly, after the cylinder has been rotated 180°, the dog will be in the position illustrated in dotted lines in FIG. 4, that is, it will have been moved out of the striker path.

It is also noted that, because of the action of the balancing weight 21, and the action of the spring 25, the dog 11 will remain in the striker path unless, and until, withdrawn therefrom by either the action of the striker on the camming surface 13 of the dog when the door is moved downwardly, or by the action of the key in the lock rotating the cylinder.

Figure 5:
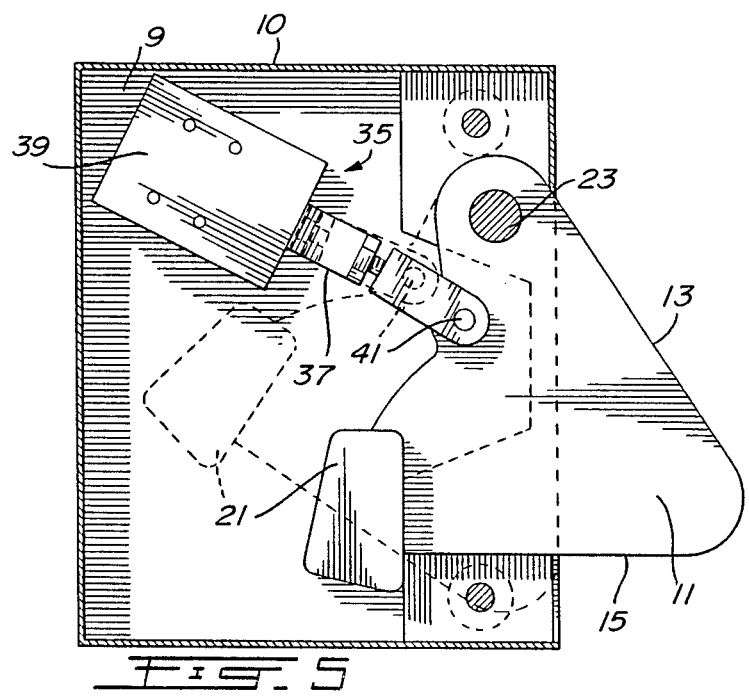
FIG. 5 illustrates an electrical embodiment of the lock mechanism.

Turning now to FIG. 5, the electrical embodiment also includes a balancing weight 21 on the dog 11, and the dog is once again pivotable about a rod 23. However, the electrical embodiment includes a solenoid 35 having a plunger 37 biased outwardly by a spring 39. The end of the plunger is connected to a pin 41 mounted on the dog 11.

When the door is moved downwardly so that the striker 17 cams against the camming surface 13, the dog 11 will be pushed into the casing 10 against the action of the spring 39. When the striker is below the stop surface 15, then the dog 11 can be withdrawn out of the striker path only by the action of the key. Turning the key will close a switch which will provide power to the solenoid so as to draw the plunger into the solenoid against the action of the spring 39. At that time, the dog will be in the position as shown in dotted lines in FIG. 5.

Although the locking arrangement has been illustrated above for use in association with a mobile vehicle door, it would be obvious to one skilled in the art that the same arrangement could be used on a non-mobile enclosure such as, for example, a shed or the like. The locking arrangement will operate with any enclosure having a roll-up door.

In addition, although in the present embodiment, the lock mechanism has been illustrated as being mounted on a side wall, it will be appreciated that, the mechanism can be mounted on other places, for example, it can extend from a bracket on the guide rails for the roll-up door. It is only necessary that the dog of the lock mechanism extends into the striker path and that, preferably, it is not disposed in the door opening.

Although several embodiments have been illustrated, this was for the purpose of describing, but not limiting the invention. Various modifications, which will come readily to the mind of one skilled in the art, are within the scope of the invention as defined in the appended claims.

I claim:

1. A mobile vehicle having an enclosure including an end wall, an opening in said end wall, first and second side walls on either side of said end wall, and a roll-up door for rolling up and down over said opening to respectively open and close said opening, said first and second side walls and said end wall comprising the walls of said enclosure, and a locking arrangement which automatically locks said door when it is closed; said locking arrangement comprising:

a striker member mounted on one side of said door adjacent said first side wall to define a striker path when said door is moved upwardly or downwardly;

a lock mechanism, having a cylinder and a key opening, said key opening being mounted on the exterior of said first side wall and between the top and bottom ends of said opening, said cylinder extending from said key opening and through said first side wall, whereby, said lock mechanism is mounted within said enclosure and said key opening is disposed on said first side wall exterior of said enclosure;

said lock mechanism including a dog, said dog comprising a plate member of a somewhat triangular shape and having a top camming edge and a bottom stop edge, and means for biasing said camming edge of said dog to removably extend into said striker path such that the plate member extends at right angles to said path;

said dog being pivotally mounted such that when said door is above said dog and is moved downwardly, said striker cams with said camming surface and forces said dog out of said striker path; and when said striker is below said dog and said door is moved upwardly, said striker engages said bottom stop surface of said dog and said door is therefore stopped by said bottom stop surface.

2. An arrangement as defined in claim 1 wherein said lock mechanism comprises a casing; said dog extending out of said casing in the direction of said door.

3. An arrangement as defined in claim 2 wherein said striker comprises a horizontal bar which cams with said top camming surface and is stopped by said bottom stop surface.

4. An arrangement as defined in claim 3 wherein said dog of said lock mechanism is biased outwardly of said casing by spring means.

* * * * *